(12) United States Patent
Adams et al.

(10) Patent No.: US 11,106,458 B2
(45) Date of Patent: Aug. 31, 2021

(54) SYSTEM AND METHOD FOR DISTRIBUTED LEDGER-BASED SOFTWARE SUPPLY CHAIN MANAGEMENT

(71) Applicant: JPMORGAN CHASE BANK, N.A., New York, NY (US)

(72) Inventors: Duncan Adams, Keysoe (GB); Alex Hayzelden, Chigwell (GB); Vaidyalingam Ramalingam, Bournemouth (GB); Trevor Collins, Mayford (GB); Andrew J. Muller, East Windsor, NJ (US); Stephen Flaherty, Clarkston (GB); Tanmay Madan, Queensbury (GB); Robert Falconer Keith, Cardross (GB); Ashish Tiwari, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/513,114

(22) Filed: Jul. 16, 2019

(65) Prior Publication Data
US 2020/0026510 A1    Jan. 23, 2020

Related U.S. Application Data

(60) Provisional application No. 62/699,313, filed on Jul. 17, 2018.

(51) Int. Cl.
*H04L 9/32* (2006.01)
*G06F 8/71* (2018.01)
(Continued)

(52) U.S. Cl.
CPC ............ *G06F 8/70* (2013.01); *G06F 11/3692* (2013.01); *G06F 21/57* (2013.01); *G06F 21/60* (2013.01); *G06F 21/645* (2013.01); *H04L 9/321* (2013.01)

(58) Field of Classification Search
CPC ..... H04L 9/321; H04L 9/3239; G06F 21/645; G06F 21/57; G06F 21/60; G06F 11/3692; G06F 8/70
See application file for complete search history.

(56) References Cited

U.S. PATENT DOCUMENTS

| 7,003,560 B1 * | 2/2006 | Mullen | G06Q 10/06 709/223 |
| 10,565,644 B2 * | 2/2020 | Leonard | H04L 9/088 |

(Continued)

FOREIGN PATENT DOCUMENTS

WO    2017027648    2/2017

OTHER PUBLICATIONS

Valentina Lenarsuzzi et al., Blockchain application for Agile methodologies, May 21-25, 2018, [Retrieved on Mar. 10, 2021]. Retrieved from the internet: <URL: https://dl.acm.org/doi/pdf/10.1145/3234152.3234155> 3 Pages (1-3) (Year: 2018).*

(Continued)

*Primary Examiner* — Anibal Rivera
(74) *Attorney, Agent, or Firm* — Greenberg Traurig LLP (57) ABSTRACT

Systems and methods for distributed ledger-based software supply chain management are disclosed. According to one embodiment, in an information processing apparatus comprising at least one computer processor, a method for distributed ledger-based software supply chain management may include: (1) receiving, from a software tool, a metadata artifact for a software development lifecycle event; (2) writing the metadata artifact to a metadata store; and (3)
(Continued)

updating a present state database with values for metadata keys referencing the metadata artifact in the metadata store.

17 Claims, 3 Drawing Sheets

(51) Int. Cl.
*G06F 21/62* (2013.01)
*G06F 8/70* (2018.01)
*G06F 21/60* (2013.01)
*G06F 21/64* (2013.01)
*G06F 11/36* (2006.01)
*G06F 21/57* (2013.01)

(56) References Cited

U.S. PATENT DOCUMENTS

| | | | | |
|---|---|---|---|---|
| 10,789,590 | B2* | 9/2020 | Tran | G06Q 20/382 |
| 2008/0082517 | A1* | 4/2008 | Sattler | G06F 8/71 |
| 2008/0092107 | A1* | 4/2008 | McWilliam | G06F 8/20 |
| | | | | 717/101 |
| 2015/0347119 | A1* | 12/2015 | Wang | G06F 8/65 |
| | | | | 717/120 |
| 2015/0379510 | A1* | 12/2015 | Smith | G06Q 20/3829 |
| | | | | 705/71 |
| 2016/0260169 | A1* | 9/2016 | Arnold | G06Q 40/12 |
| 2016/0292672 | A1* | 10/2016 | Fay | G06Q 20/3829 |
| 2017/0287090 | A1* | 10/2017 | Hunn | G06Q 50/18 |
| 2017/0364450 | A1* | 12/2017 | Struttmann | G06F 12/1408 |
| 2017/0364698 | A1* | 12/2017 | Goldfarb | G06F 16/9024 |
| 2017/0364699 | A1* | 12/2017 | Goldfarb | G06F 21/6227 |
| 2017/0364700 | A1* | 12/2017 | Goldfarb | G06F 21/6218 |
| 2017/0364701 | A1* | 12/2017 | Struttmann | G06F 16/2282 |
| 2017/0366353 | A1* | 12/2017 | Struttmann | G06F 21/64 |
| 2018/0205552 | A1* | 7/2018 | Struttmann | H04L 9/0637 |
| 2018/0278582 | A1* | 9/2018 | Cleaver | H04L 67/10 |
| 2018/0307857 | A1* | 10/2018 | Beecham | G06F 16/9024 |
| 2018/0341648 | A1* | 11/2018 | Kakavand | G06Q 50/18 |
| 2018/0375888 | A1* | 12/2018 | Christian | G06N 20/00 |
| 2019/0121669 | A1* | 4/2019 | Almasan | G06F 9/4881 |
| 2019/0129893 | A1* | 5/2019 | Baird, III | H04L 9/30 |
| 2019/0132350 | A1* | 5/2019 | Smith | G06F 16/2379 |
| 2019/0163912 | A1* | 5/2019 | Kumar | H04L 9/3247 |
| 2019/0172073 | A1* | 6/2019 | Wiig | G06N 20/00 |
| 2019/0229915 | A1* | 7/2019 | Digiambattista | H04L 9/321 |
| 2019/0230129 | A1* | 7/2019 | Digiambattista | H04L 63/20 |
| 2019/0279321 | A1* | 9/2019 | Sheets | H04L 9/0643 |
| 2019/0303541 | A1* | 10/2019 | Reddy | H04L 9/0643 |
| 2019/0303579 | A1* | 10/2019 | Reddy | G06F 21/57 |
| 2019/0303623 | A1* | 10/2019 | Reddy | G06F 11/3692 |
| 2019/0305957 | A1* | 10/2019 | Reddy | H04L 63/123 |
| 2019/0305959 | A1* | 10/2019 | Reddy | G06F 8/60 |
| 2019/0306173 | A1* | 10/2019 | Reddy | H04L 63/126 |
| 2019/0317756 | A1* | 10/2019 | Bough | G06F 8/71 |
| 2019/0385229 | A1* | 12/2019 | Leonard | H04L 9/0637 |
| 2019/0394242 | A1* | 12/2019 | Wig | H04L 9/3093 |
| 2019/0394243 | A1* | 12/2019 | Wiig | H04L 63/0876 |
| 2020/0007513 | A1* | 1/2020 | Gleichauf | H04L 63/00 |
| 2020/0076571 | A1* | 3/2020 | Natarajan | G06F 16/2246 |
| 2020/0204574 | A1* | 6/2020 | Christian | G06K 9/6218 |

OTHER PUBLICATIONS

International Search Report, dated Nov. 13, 2019, from corresponding International Application No. PCT/US2019/041982.
Written Opinion of the International Searching Authority, dated Nov. 13, 2019, from corresponding International Application No. PCT/US2019/041982.

* cited by examiner

SYSTEM AND METHOD FOR DISTRIBUTED LEDGER-BASED SOFTWARE SUPPLY CHAIN MANAGEMENT

RELATED APPLICATIONS

This application claims priority to, and the benefit of, U.S. Provisional Patent Application Ser. No. 62/699,313 filed Jul. 17, 2018, the disclosure of which is hereby incorporated, by reference, in its entirety.

BACKGROUND OF THE INVENTION

1. Field of the Invention

The present disclosure generally relates to systems and methods for distributed ledger-based software supply chain management.

2. Description of the Related Art

Within software development, the processes and tools used are often disjointed at each phase of the development lifecycle. The origins and composition of software components are often overlooked, particularly for open source and free software.

SUMMARY OF THE INVENTION

Systems and methods for distributed ledger-based software supply chain management are disclosed. According to one embodiment, in an information processing apparatus comprising at least one computer processor, a method for distributed ledger-based software supply chain management may include: (1) receiving, from a software tool, a metadata artifact for a software development lifecycle event; (2) writing the metadata artifact to a metadata store; and (3) updating a present state database with values for metadata keys referencing the metadata artifact in the metadata store.

In one embodiment, the software development lifecycle event may include one or more of creating a requirement or a defect record in a planning system, committing a line of code in a source code management tool, a software build, completion of a test or scan, a deployment to an end system, and a process starting on a server.

In one embodiment, the metadata artifact may include at least one of an artifact name, an organization ID, a creation time, an artifact type, an artifact data, an artifact hash, a reference of hash, and a reference ID of the software tool.

In one embodiment, the metadata artifact may refer to the software development lifecycle event.

In one embodiment, the software tool may be part of a software lifecycle.

In one embodiment, the metadata artifact may be encrypted, and the method may also include decrypting the metadata artifact.

In one embodiment, the metadata artifact may be received over a message bus.

In one embodiment, the metadata store may maintain an immutable record of the metadata artifact.

In one embodiment, the metadata store may include a blockchain-based distributed ledger, a hashgraph, a stream processing service, a noSQL database, a conventional relational database, etc.

In one embodiment, the present state database may include a key/value pair database, wherein each key is a value of stored metadata and references an underlying data source record.

According to another embodiment, in an information processing apparatus comprising at least one computer processor, a method for distributed ledger-based software supply chain management may include: (1) receiving a file of interest; (2) generating a hash of the file of interest, wherein the hash uniquely identifies the file of interest; (3) searching a present state database with the hash; (4) receiving a record from the present state database that matches the hash; (5) retrieving a block from a metadata store referenced by the record; and (6) retrieving a file archive associated with the record.

In one embodiment, the metadata store may maintain an immutable record of the metadata artifact.

In one embodiment, the metadata store may include a blockchain-based distributed ledger, a hashgraph, a stream processing service, a noSQL database, a conventional relational database, etc.

In one embodiment, the present state database may include a key/value pair database, wherein each key is a value of stored metadata and references an underlying data source record.

In one embodiment, the method may further include providing the file archive to a downstream system.

In one embodiment, the file archive may identify a source of the file of interest, may include source code for the file of interest, etc.

According to another embodiment, a system for distributed ledger-based software supply chain management may include a plurality of software development tools; a controller; a metadata store, wherein the metadata store maintains an immutable record of a plurality of metadata artifacts; and a present state database comprising a key/value pair database, wherein each key is a value of stored metadata and references an underlying data source record. The controller may receive a metadata artifact for a software development lifecycle event from one of the software development tools; may write the metadata artifact to the metadata store; and may update the present state database with values for metadata keys referencing the metadata artifact in the metadata store.

In one embodiment, the controller may further receive a file of interest; may generate a hash of the file of interest, wherein the hash uniquely identifies the file of interest; may search the present state database with the hash; may retrieve a record from the present state database that matches the hash; may retrieve a block from a metadata store referenced by the record; and may retrieve a file archive associated with the record.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for distributed ledger-based software supply chain management are disclosed.

Embodiments disclosed herein provide traceability throughout the software lifecycle, for example, from software development to software deployment to software retirement/removal. Embodiments support governance and control processes that exist in the corporate environment.

In order to understand the traceability through the software supply chain, two key areas need to be considered. The first is process artifact traceability. Software generally goes through multiple phases during its lifecycle, from initial inception and design, though construction, testing, release, and eventually retirement. Each of these phases generates data records that are typically held in multiple tools and systems. These tools must be linked up to provide full visibility into software supply chain (e.g., plan, develop, compile, build, scan, test, deploy, release, run).

Planning process artifacts may include bug fixes references, new feature references, class diagrams, use cases, design and architecture, business requirements, etc. Development process artifacts may include bug fixes references, commit references, author(s), change histories, software versions, etc. Compile process artifacts may include compile tool versions, dependency information, etc. Build process artifacts may include build definitions, unit test results, package signatures, etc. Scan process artifacts may include quality scan results, security scan results, risk scan results, etc. Test process artifacts may include test plans, test results, performance/limits/capacity analysis, test acceptance, etc. Deploy process artifacts may include deployment configurations, dependency configurations, server environments, etc. Release process artifacts may include server configurations, dependency configurations, server environment, etc. Run process artifacts may include error logs, resource usage, process history, etc.

The second is software artifact traceability. Most running software is assembled from a number of separate components usually involving application code, third party libraries, and run time dependencies. Understanding the origin and use of these components, where and which versions are used, and where they were sourced is required to be able to fully support a piece of software. These can constantly change over time due to bug fixes, security fixes, licensing requirements or business needs.

Software artifacts may include code, binaries, libraries, and packages.

Once the traceability records have been established, one needs to ensure that records are accurate and have not been manipulated. This is essential for any audit trail for the production of software. The auditability of the software process can be thought of in the reverse direction to the production of software—given a piece of running software, can you identify how and why it got into a running state, including quality and approvals, along with the components and code used to build it?

Traditionally, the auditability and traceability of software has been a manual, or, at best, a semi-automated process, and normally only goes to the point of making the software available for deployment. Modern software construction, however, involves continuous integration and delivery to multiple auto-scaling cloud environments, which means that manual controls are not sufficient. There is a clear need to be able to automatically record and update records of both the software processes and artifact.

In order to be able to guarantee the validity of any artifact, the metadata stored may be signed by the source of the data. Digital signing requires each system producing data to have its own certificate that can identify the system. Code signing utilizes public key cryptography to create a digital signature that can uniquely identify an artifact and its originating owner. This digital signature may be provided as an additional piece of metadata to the data store.

Organizations often have a number of software data repositories for software artifacts. Data stores are generally built around the very specific needs of the software system that holds the data. For example, there are standard repositories offering common reusable components distributed by language specific dependency management solutions such as MAVEN for JAVA, NPM for node.js and NUGET for .Net applications. Common software package formats for installing packages also have repository solutions offering package dependency management, such as YELLOWDOG UPDATER, Modified (YUM) for RPM and ADVANCED PACKAGE TOOL (APT) for DEBIAN packages. Further software repository types containing full Virtual Machine Images and more latterly container images also exist. Most of these repository types have versions available for public consumption. In addition, a number of vendors offer repositories that support multiple different repository types.

All of these repositories have the ability to store both software and artifact data (e.g., details of what version of the tool that was used) and may be leveraged as data stores.

In embodiments, data for the application may be provided to the data store by posting to a REST interface which would in turn store the data appropriately. Additional REST interfaces may be provided to retrieve data from the store to allow for the reporting of any software artifact as is necessary and/or desired.

Along with reporting on software artifacts, data from the software development life cycle, or SDLC, may be leveraged to support the control systems such as approval systems or automated deployment systems. This may be achieved by either providing comprehensive reporting to the approver, or by creating auto-approval systems based on the solution. For example, minimum standards for risk and quality scan results, or performance test results, may be used to support any control decisions. In one embodiment, control systems may base decisions on adherence to other corporate policies, such as the particular source code repositories or build systems being used to produce the data, as well as machine learning.

Third party software may also leverage this solution, where the use of any software may be dictated by the metadata held around the software. This may include risk information, such as known software issues, vendor licensing restrictions, and/or architectural choices.

In one embodiment, each process or event within an application's lifecycle may be a "transaction" for which the meta-data may be written as a new block, or part of a new block, on the chain. For example, each transaction may create a permanent record and may allow each part of the software supply chain to be linked together.

In one embodiment, each application may have its own SDLC history written to the distributed ledger. In another embodiment, each instance of the application may have its own SDLC history written to the distributed ledger (e.g., each instance of an application may share a common SDLC history from development to deployment, but may have a specific SDLC history following deployment based on how and/or where it was deployed, how it was, used, etc.).

The application lifecycle data may have a number of applications. For example, because the data source is both immutable and known, it may be used to make automated deployment solutions. Examples include verifying that all software has followed the correct software creation process, verifying that appropriate quality and security levels have been met, analysis of what testing has been performed, etc. If the information does not exist or does not meet the minimum requirements, this may be flagged to the deployment team for automated resolution, or it may trigger a manual exception process. Whether the approval decision is manual or automated, the decision may be added to the traceability records.

Traditional models, where software is promoted to a deployable state and made available via a software repository, are point-in-time decisions that may be made well in advance of actual deployment. Because, in embodiments, the full traceability records for the software exist, all the information associated with the software is known at deployment time and can be checked should new information become available about the legitimacy of the software. For example, this may be something as simple as the traceability record containing a flag indicating the software has now been retired, or more complex decisions based on the dependency information, combined with the time of the scans and new vulnerability records being created.

In one embodiment, the data may be used to assess vulnerability. When new software vulnerabilities are identified, in order to understand their likely impact, it is necessary to understand where and how the vulnerable software is used. This requires not only knowing what software contains the vulnerability, but also where that software is currently running By interrogating the traceability records, this information may be easily retrieved. In addition, if the approval systems are also using the traceability data, they may prevent any further deployments of the vulnerable software.

In another embodiment, having all the data records of each of the tools in the software supply chain across all software delivery may provide valuable insights into the performance of the entire software delivery process and performance of the SDLC. This may be based on, for example, how the tools of the SDLC process themselves are performing (e.g., the number of builds through the build systems, deployment velocities, etc.). In embodiments, runtime failures may be correlated to code quality or fragile testing discipline. Reports on process compliance may be generated, and may identify potential bottlenecks in the whole process flow.

In another embodiment, the data may be used to monitor resource usage. The move to automation in software delivery with increased adoption of Continuous Integration (CI) and Continuous Delivery (CD) methods has resulted in an increase in the amount of hardware compute and storage resources required to support it. The software traceability data may manage both existing requirements and potential future demand. By understanding what software is actually running in production environments, and identifying what software is no longer running, being used, etc., older versions may be removed, and the storage resources released. Existing build and deployment numbers may be tracked to understand adoption numbers observe usage trends and plan for expansion of hardware resources or license expansion.

Combining the traceability data with operational data and business data may provide insights in terms of costs and effectiveness of solutions. For example, as the traceability data may allow tracing an application back to the business requirements, and combining that data with real customer feedback may establish whether the application delivered (or is delivering) in terms of its intended purpose. Understanding the progression of software through the SDLC may also allow the business to understand software development tooling in terms of value rather than costs.

In one embodiment, machine learning may be applied to the traceability data to identify issues through the SDLC. For example, unusually large code bases or long build times may indicate issues with application structure. Alternatively, abnormal patterns of behavior may be identified, such as unusual code commits or deployment activity, which may indicate malicious activity. Machine learning may assist in analyzing how applications are developed, how they perform, and how users interact with the application, therefore providing a greater understanding of the impact of code releases on the business objectives.

Figure 1:
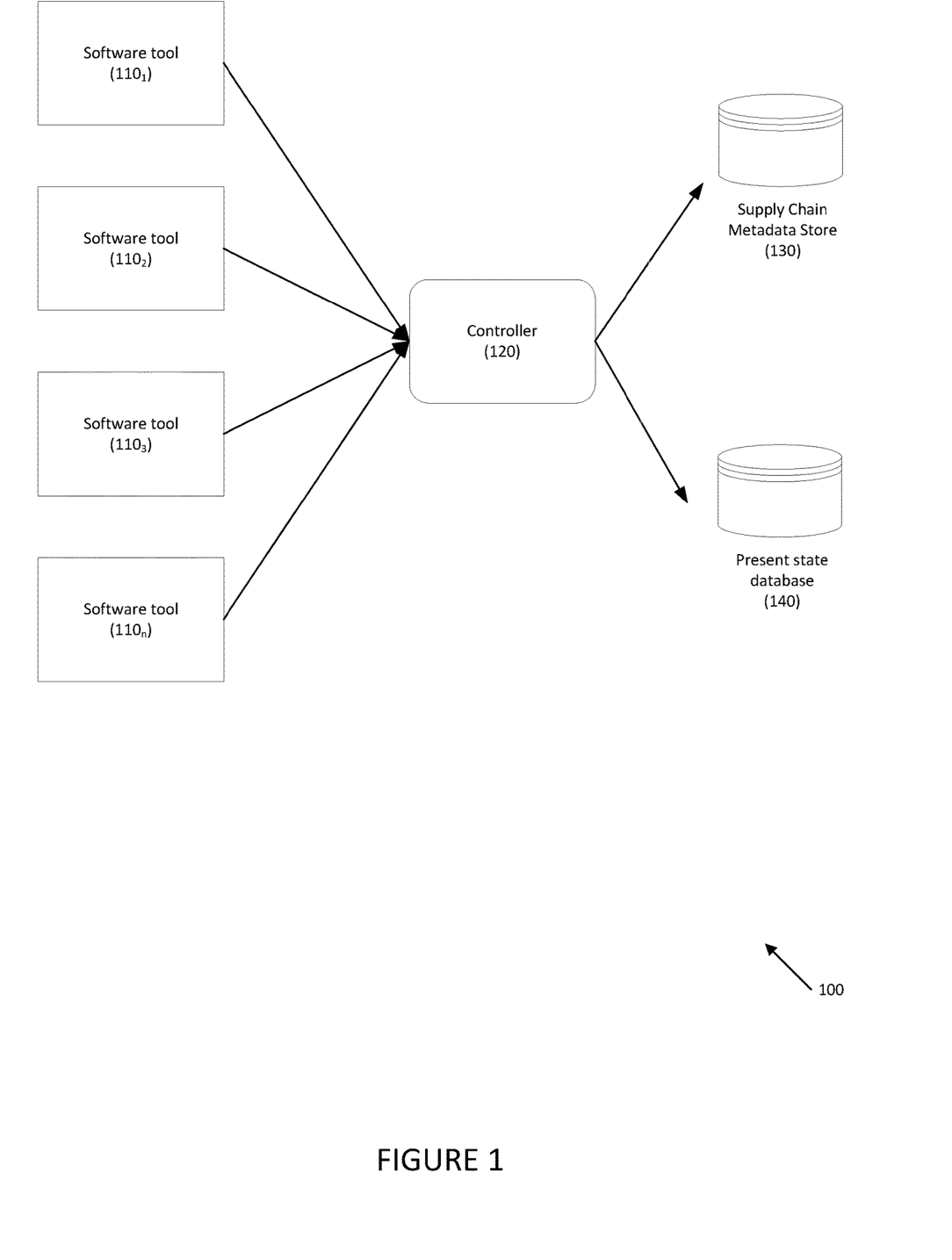
FIG. 1 depicts a system for distributed ledger-based software supply chain management according to one embodiment.

Referring to FIG. 1, system for distributed ledger-based software supply chain management is disclosed according to one embodiment. System 100 may include software tools $110_1, 110_2, \ldots 110_n$, controller 120, metadata store 130, and present state database 140.

Each software tool 110 may create a metadata artifact in response to an external event, such as creating a requirement or defect record in a planning system, committing a line of code in a source code management tool, a software build, completion of a test or scan, deployment to an end system, a process starting on a server, etc. The events that are traced may depend on the use case of the supply chain data. Examples of metadata may include, for example, an artifact name, an organization ID, a creation time (e.g., UTC), an artifact type, artifact data, an artifact hash, a reference of the hash, a reference ID of creating tool, list of supply chain references, etc.) Additional metadata may be added depending on the use case, or may be provided by the artifacts themselves. In one embodiment, the artifacts may not be stored; only references to the artifacts are stored. Artifacts may be maintained by the respective tool 110, or in a separate artifact repository (not shown).

As used herein, a metadata artifact refers to the actual record of an event, and metadata refers to the data that is written to a store, such as a distributed ledger. For example, the metadata artifact may refer to, or be part of, the metadata itself (e.g., a deploy record will reference the deployment system that will have the actual record of where the software is deployed, or the metadata could hold that information itself).

Each software tool 110 may include a certificate to identify the tool, with a public/private key pair used to encrypt and decrypt the hash of the metadata. In one embodiment, each software tool 110 may include a plurality of certificates that may change over time, depending on the requirements of the system. Certificates may be generated by a trusted source.

Signing the metadata may not preclude attaching data to the supply chain data. The interpretation of unsigned data may be the responsibility of the system viewing the data. For example, an automated approval system may not approve a deployment from an unknown source depending on the environment, a compliance tool may not approve a deployment from an unknown source depending on the environment, a compliance tool may raise an exception against a tool that is not known, etc. In one embodiment, if metadata store 130 is permissioned, then unsigned artifacts may not be accepted.

In one embodiment, once generated, the metadata may be made available.

Each software tool 110 may create a recordable artifact. Examples include a data record that references a defect ticket, a record of a deployment, a test summary, etc. For large data artifacts, such as binary files, build bill of materials, scan results, detailed test results, a reference to the original data may be maintained.

Software tools 110 may produce a hash of the data with a reference to the data so that the data may be verified.

Each software tool 110 may supply a list of references to elements from the supply chain that it has leveraged. Examples include a reference to a defect ticket, a source code commit, a third-party complier used as part of a build, environment data, etc. For certain events, the file artifact hash may be the only reference required to link the data to the respective tool 110 in the tool chain.

For references to composite file types, such as archive file formats (e.g., zip, tar, Java jar, War, etc.), and packaged software formats (e.g., RPM, Nuget, NPM, etc.), each individual file comprising the composite file may create a separate metadata artifact referring to the composite file type.

Examples of software tools may include, for example, JIRA, GIT, GITHUB, BITBUCKET, GITLABS, JENKINS, TEAM CITY, MICROSOFT VSTS, BLACKDUCK, AQUA, JFROG ARTIFACTORY, NEXUS, SPINNAKER, etc.

Controller 120 may include one or more electronic devices (e.g., servers, workstations, cloud, etc.) that may execute a program or application that may abstract supply chain data from the actual storage technology so that each SDLC tool may write the data without having to understand or implement the underlying storage technology. It may control access to metadata store 130 in a permissioned system, and may enforce any policy rules (e.g., not accepting unsigned data or data signed from unknown sources). It may also check whether the data already exists, and may create the transaction to be written to metadata store 130.

In one embodiment, software tools 110 may communicate with controller 110 using a message bus (not shown).

Metadata store 130 may be a source of reference data. Metadata store 130 may include one or more stores.

In one embodiment, metadata store 130 may be immutable. For example, metadata store 130 may use blockchain, hashgraphs, stream processing services (e.g., immutable stream based messaging, such as Kafka), noSQL databases, conventional relational databases, etc.

In one embodiment, metadata store 130 may include multiple, different instances or storage solutions. For example, a distributed, un-permissioned blockchain solution may be maintained for external dependency records, a hashgraph may be used for the SDLC tool chain tools, and a stream processing platform may be used for deployment and run-time events.

In one embodiment, all metadata may be written to metadata store 130. Metadata store 130 may be permissioned and private, or it may be public and un-permissioned.

In one embodiment, metadata store 130 may only be updated by controller 120.

Present state database 140 may be a key/value pair database where each key is a value of the metadata stored and provides a reference to the underlying data source record. It may provide a simplified search of the underlying metadata store.

In one embodiment, present state database 140 may be reconstructed from data in metadata store 130. It may be updated by controller 120 or may be created as part of an event to metadata store 130.

Figure 2:
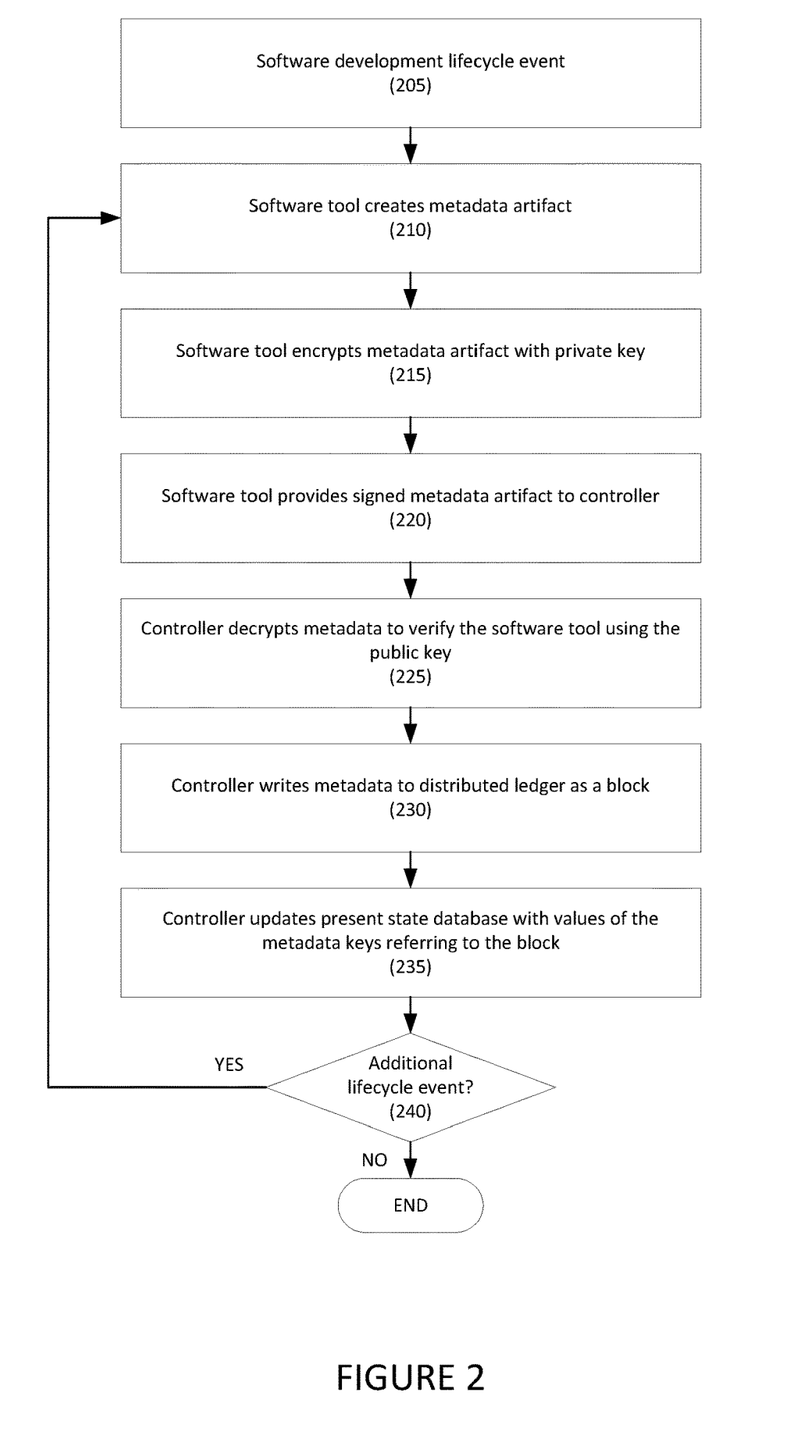
FIG. 2 depicts a method for distributed ledger-based software supply chain management according to one embodiment.

Referring to FIG. 2, an exemplary process of distributed ledger-based software supply chain management is disclosed according to one embodiment.

In step 205, a software development lifecycle event occurs. Examples include creating a requirement or defect record in a planning system, committing a line of code in a source code management tool, a software build, completion of a test or scan, deployment to an end system, a process starting on a server, etc.

In step 210, a software tool that is involved in the software development lifecycle may create a metadata artifact for the event.

In step 215, the software tool may encrypt the metadata artifact with a private key, and in step 220, may communicate the signed metadata artifact to a controller. In one embodiment, the signed metadata artifact may be communicated using a message bus.

In step 225, the controller may decrypt the metadata artifact to verify the software tool and, in step 230, the controller may write the metadata artifact to a metadata store. In one embodiment, the metadata store may maintain an immutable record, such as a blockchain-based ledger, a hashgraph, etc. Other types of stores, such as stream processing services, noSQL databases, conventional relational databases, etc. may be used as is necessary and/or desired.

In step 235, the controller may update a present state database with values of the metadata keys referring to the artifact in the metadata store.

If there is another lifecycle event, the process may continue with step 210.

Figure 3:
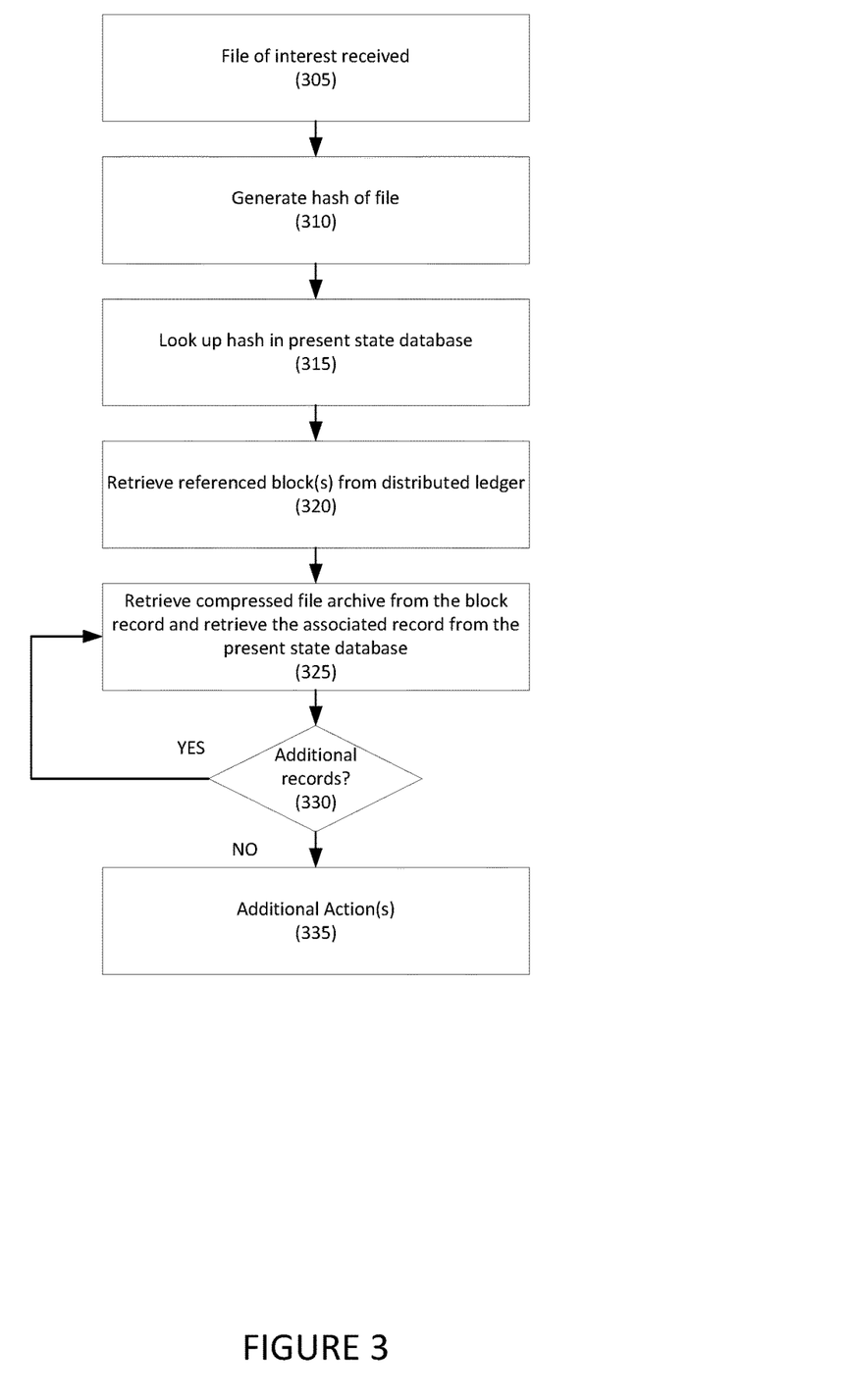
FIG. 3 depicts a method for distributed ledger-based software supply chain management according to one embodiment.

Referring to FIG. 3, a method for retrieving traceability data from a distributed ledger is disclosed according to one embodiment.

In step 305, a file of interest may be received. For example, the file of interest may be a file for which it is desired to identify the source.

In step 310, a hash of the file of the interest is generated. In one embodiment, the hash may uniquely identify the file of interest.

In step 315, the hash may be used to search the present state database. In another embodiment, a distributed ledger may be searched for the hash, and the present state database may be reconstructed from the metadata store.

In one embodiment, one or more records may be identified as matching the hash.

In step 320, the block(s) referenced by the one or more records may be retrieved from the metadata store. In one embodiment, the metadata store may include a distributed ledger.

In step 325, compressed file archive(s) from the block record(s) may be retrieved with the associated record from the present state database.

In step 330, if there are additional records identified in step 315, the process may be repeated until all compressed file archives and associated records are retrieved.

In one embodiment, in step 335, after all records are retrieved, one or more additional actions may be taken. For example, the record(s) may be provided to the user, provided in a report, may be used by other systems, etc. The action(s) taken may depend on the particular use case, the purpose of the retrieval, etc. For example, if the file is a malicious file, the source of the file may be returned. As another example, if the developer seeks to fix code, the developer may seek the source code. Any other suitable use may be provided as is necessary and/or desired.

Although multiple embodiments have been disclosed, it should be recognized that these embodiments are not mutually exclusive, and features from one embodiment may be used with others.

Hereinafter, general aspects of implementation of the systems and methods of the invention will be described.

The system of the invention or portions of the system of the invention may be in the form of a "processing machine,"

such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for distributed ledger-based software supply chain management comprising:
   in an information processing apparatus comprising at least one computer processor:
      receiving, from a software tool and over a message bus, a metadata artifact comprising at least one of an artifact name, an organization ID, a creation time, an artifact type, an artifact data, an artifact hash, a reference of hash, and a reference ID of the software tool, wherein the metadata artifact contains data for a software development lifecycle event including at least one of creating a requirement or a defect record in a planning system, committing a line
   of code in a source code management tool, a software build, completion of a test or scan and a deployment to an end system;
      writing the metadata artifact to a metadata store; and
      updating a present state database with values for metadata keys referencing the metadata artifact in the metadata store.

2. The method of claim 1, wherein the metadata artifact refers to the software development lifecycle event.

3. The method of claim 1, wherein the software tool is part of a software lifecycle.

4. The method of claim 1, wherein the metadata artifact is encrypted, and the method further comprises decrypting the metadata artifact.

5. The method of claim 1, wherein the metadata store maintains an immutable record of the metadata artifact.

6. The method of claim 1, wherein the metadata store comprises a blockchain-based distributed ledger or a hashgraph.

7. The method of claim 1, wherein the metadata store comprises one of a stream processing service, a noSQL database, and a conventional relational database.

8. The method of claim 1, wherein the present state database comprises a key/value pair database, wherein each key is a value of stored metadata and references an underlying data source record.

9. A method for distributed ledger-based software supply chain management comprising:
   in an information processing apparatus comprising at least one computer processor:

receiving a file of interest;

generating a hash of the file of interest, wherein the hash uniquely identifies the file of interest;

searching a present state database with the hash;

receiving a record from the present state database that matches the hash;

retrieving a block from a metadata store referenced by the record, wherein the metadata store includes a metadata artifact that contains data for a software development lifecycle event including at least one of creating a requirement or a defect record in a planning system, committing a line of code in a source code management tool, a software build, completion of a test or scan and a deployment to an end system; and retrieving a file archive associated with the record.

10. The method of claim 9, wherein the metadata store maintains an immutable record of the metadata artifact.

11. The method of claim 9, wherein the metadata store comprises a blockchain-based distributed ledger or a hashgraph.

12. The method of claim 9, wherein the present state database comprises a key/value pair database, wherein each key is a value of stored metadata and references an underlying data source record.

13. The method of claim 9, further comprising:

providing the file archive to a downstream system.

14. The method of claim 9, wherein the file archive identifies a source of the file of interest.

15. The method of claim 9, wherein the file archive comprises source code for the file of interest.

16. A system for distributed ledger-based software supply chain management comprising:

a plurality of software development tools, each software development tool executed by a computer processor;

a controller executed by a computer processor;

a metadata store, wherein the metadata store maintains an immutable record of a plurality of metadata artifacts, wherein each metadata artifact comprises at least one of an artifact name, an organization ID, a creation time, an artifact type, an artifact data, an artifact hash, a reference of hash, and a reference ID of the software development tool, wherein the metadata artifact contains data for a software development lifecycle event including at least one of creating a requirement or a defect record in a planning system, committing a line of code in a source code management tool, a software build, completion of a test or scan and a deployment to an end system; and a present state database comprising a key/value pair database, wherein each key is a value of stored metadata and references an underlying data source record;

wherein:

the controller receives a metadata artifact for a software development lifecycle event from one of the software development tools over a message bus;

the controller writes the metadata artifact to the metadata store; and the controller updates the present state database with values for metadata keys referencing the metadata artifact in the metadata store.

17. The system of claim 16, wherein:

the controller receives a file of interest;

the controller generates a hash of the file of interest, wherein the hash uniquely identifies the file of interest;

the controller searches the present state database with the hash;

the controller retrieves a record from the present state database that matches the hash;

the controller retrieves a block from a metadata store referenced by the record; and the controller retrieves a file archive associated with the record.

* * * * *